(12) United States Patent
Kahn et al.

(10) Patent No.: US 7,835,522 B2
(45) Date of Patent: *Nov. 16, 2010

(54) EMBEDDED BLACKLISTING FOR DIGITAL BROADCAST SYSTEM SECURITY

(75) Inventors: Raynold M. Kahn, Los Angeles, CA (US); Gregory J. Gagnon, Torrance, CA (US); David D. Ha, San Gabriel, CA (US); Dennis R. Flaharty, Irvine, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1316 days.

This patent is subject to a terminal disclaimer.

(21) Appl. No.: 11/351,926

(22) Filed: Feb. 10, 2006

(65) Prior Publication Data

US 2006/0161976 A1 Jul. 20, 2006

Related U.S. Application Data

(63) Continuation of application No. 09/954,236, filed on Sep. 14, 2001, now Pat. No. 7,039,955.

(51) Int. Cl.
*H04L 29/06* (2006.01)
*G06F 21/00* (2006.01)
*H04L 29/02* (2006.01)

(52) U.S. Cl. ...................... 380/241; 713/168
(58) Field of Classification Search ............... 726/2–3, 726/16, 20–21, 27–29, 24–35; 713/185, 713/182, 192; 380/228–229, 232, 239–242
See application file for complete search history.

(56) References Cited

U.S. PATENT DOCUMENTS 5,680,457 A * 10/1997 Bestler et al. ............... 380/239

* cited by examiner

*Primary Examiner*—Gilberto Barron, Jr.
*Assistant Examiner*—Venkat Perungavoor (57) ABSTRACT

An apparatus and method for transmission security is presented. In one embodiment, the apparatus comprises a receiver communicatively coupleable to an identifiable replaceable conditional access module (CAM) identified by an identification to enable reception of the service, and an authenticator controlling the operability of the receiver according to a comparison between the identification and a list comprising an identification of a plurality of CAMs, wherein the authenticator renders the receiver inoperable according to the comparison.

44 Claims, 7 Drawing Sheets

EMBEDDED BLACKLISTING FOR DIGITAL BROADCAST SYSTEM SECURITY

This application is a continuation of U.S. patent application Ser. No. 09/954,236 filed Sep. 14, 2001, entitled "EMBEDDED BLACKLISTING FOR DIGITAL BROADCAST SYSTEM SECURITY," by Raynold M. Kahn, et al., issued May 2, 2006 as U.S. Pat. No. 7,039,955.

BACKGROUND OF THE INVENTION

1. Field of the Invention

This invention relates to the security systems for digital broadcast systems, and in particular to security systems for digital broadcast systems using conditional access modules (CAMs).

2. Description of the Related Art

Illegal reception is a threat which looms over virtually every form of subscription based and pay-per-view transmission system. Broadcast systems are particularly vulnerable because, in a worst case, the illegal interception and decoding may be completely undetectable by the system operator. Therefore, access control is critically important to both the profitability and viability of every such business and system. Access to the transmissions may be controlled through a number of different mechanisms.

A conditional access module or CAM is a known security device that is used to permit or deny access to certain equipment, services or the like. CAMs generally comprise a small processor having one or more electrical contacts. When the CAM is inserted into a CAM reader or other device, the electrical contacts on the CAM and similar contacts in the equipment become intercoupled, allowing the CAM to share information with the device.

CAMs are typically used in integrated receiver/decoders (IRD) for receiving satellite broadcast material. All or part of such broadcast material may be encrypted to limit access to those that have paid the appropriate fee to view the broadcast material. The CAM includes a processor having a memory storing control information that enables decryption of an encrypted television signal for viewing by a user. All broadcast material may be encrypted, thus denying access to all that do not possess the appropriate CAM. Alternatively, only a portion of the broadcast material can be encrypted. This allows those without the appropriate CAM to view some, but not all of the channels. CAMs can also be used to implement pay per view (PPV) services in which the user must pay a fee to receive a specific broadcast at a particular time. Upon receipt of the required fee, the broadcast provider can enable new control signals from the card for access to the other services. Further, in some circumstances, the CAM processors are remotely programmable. That is, program instructions implementing the processor functions can be received by the IRD and loaded into the processor memory, augmenting or substituting for existing processor program instructions.

These conditional access security systems for broadcasters of direct broadcast satellite (DBS) must be inherently dynamic to keep one step ahead of the hacker community. A system which operates using a replaceable CAM is particularly flexible. The CAM is specifically designed to be field replaceable so that the security of the system can be continually evolving. In the event the CAM is "hacked" and the access control measures have been circumvented, the access control system may be radically updated (beyond what may be accomplished through mere reprogramming of the CAM) by issuing new CAMs to lawful subscribers and new users.

New CAMs may also be introduced to increase and improve the functionality and services of the system. However, issuing new CAMs may not prevent illegal reception by those using older CAMs which have been hacked.

When the newer generation of CAM is introduced, it generally is not feasible to immediately recall the older generation of CAM. This means that there would be a period of time when the supply of circumvented, older generation cards is available through the hacker community to utilize in their unlawful attempts to modify systems to receive DBS signals without paying for the services.

This problem is compounded given the lengthy supply lines for manufacturers and retailers to produce and sell DBS systems. This lengthy supply line requires DBS program providers to support older generation CAMs for months and sometimes years after the introduction of the newer generation of CAM. Circumvented CAMs can lead to multi-million dollar losses to the content providers and the DBS broadcaster due to lost revenue from unpaid access to programming.

A less obvious, but equally serious source of losses, is the fact that newer receivers are heavily subsidized by the DBS broadcaster, in the expectation of programming revenue from the new subscriber. In the event that the new receiver is used with a circumvented CAM, these subsidies are not recoverable. Another serious outcome of the use of circumvented CAMs in new receivers, is the reduction in the availability of receivers in the retail supply chain for potential customers. Accordingly, there is a need for system and methods which limit or prevent the use of circumvented CAMs in the newer generation of receivers. It is also recognized that piracy will be discouraged if the newer receivers with advanced features will not operate with older compromised CAMs.

SUMMARY OF THE INVENTION

An apparatus for transmission security is presented. A receiver communicatively coupleable to an identifiable conditional access module (CAM) to enable reception of the service uses an authenticator to control the operability of the IRD according to a comparison between the identified conditional access module and a list of conditional access modules.

In current conditional access systems for digital broadcast services (DBS), hacked or circumvented older generation conditional access modules (CAMs) may work on newer generations of integrated receiver decoders (IRD). In a typical embodiment, this invention provides a simple and easy to implement method of selectively black listing older generation cards and preventing them from working on newer generation IRDs to help improve DBS system security.

As part of the security of a typical receiver or IRD, software is embedded that authenticates the CAM to ensure that it is viable. It is also possible to modify the authentication software at the time of manufacture so that it includes an embedded list of which CAMs are allowed to work and/or which are not allowed. A list of unauthorized CAMs is sometimes referred to as CAMs that are blacklisted.

The DBS system provider knows the individual serial numbers of the CAMs and when they will be introduced into the IRD production line. This information may also be used to alter the embedded blacklist so that new IRDs may only operate with a CAM of current or future serial numbers, but not a CAM with an older serial number. This reduces the number of IRDs in the field that are operable with the hacked, older generation CAMS. This also ensures that IRD's with newer, advanced features only work with the appropriate versions of CAM.

Also, given that the blacklist would be changing on a fairly frequent basis, the hacker community would not be able to conveniently determine which IRD would be able to work with which generation of CAM. Without the present invention, a hacked CAM would be able to operate with all types and generations of IRDs. The present invention effectively allows partitioning of the IRDs into significantly smaller groupings, which reduces the financial viability of hacking CAMs. The groups of selected blacklisted CAMs may be altered with newly produced IRDs.

This invention significantly enhances the overall security of DBS systems and requires no changes to the CAM and IRD manufacturing and distribution process, or broadcast practices of the DBS service provider.

BRIEF DESCRIPTION OF THE DRAWINGS

Reference will now be made, by way of example to the accompanying drawings, in which.

DETAILED DESCRIPTION OF PREFERRED EMBODIMENT

In the following description, reference is made to the accompanying drawings that form a part hereof, and in which show, by way of illustration, several embodiments of the present invention. It is understood that other embodiments may be utilized and structural changes may be made without departing from the scope of the present invention.

Figure 1:
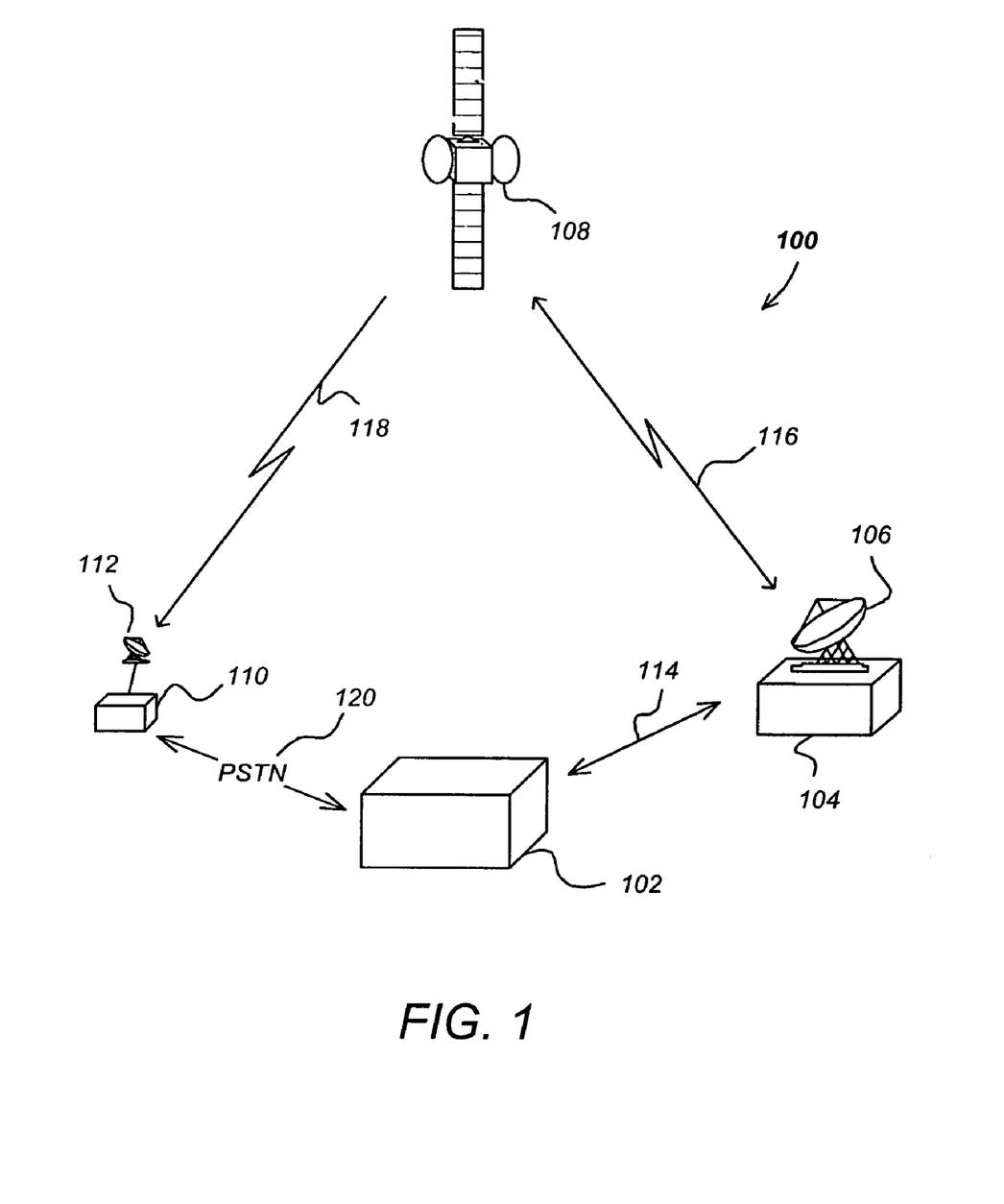
FIG. 1 is a diagram showing an overview of a program distribution system.

FIG. 1 is a diagram illustrating an overview of a video distribution system 100. The video distribution system 100 comprises a control center 102 in communication with an uplink center 104 via communication link 114 and with a receiver 110 at a subscriber via a public switched telephone network (PSTN) or other link 120. The control center 102 provides program material to the uplink 104 center, coordinates with the receivers 110 to offer pay-per-view (PPV) program services, including billing and associated decryption of video programs.

The uplink center 104 receives program material and program control information from the control center 102, and using an uplink antenna 106, transmits the program material and program control information to the satellite 108 via uplink 116. The satellite receives and transmits the video programs and control information to the subscriber via downlink 118. The receiver 110 receives this information using the subscriber antenna 112. In one embodiment, the subscriber antenna 112 is an 18-inch slightly oval-shaped Ku-band antenna.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the receivers 110. However, using data compression and multiplexing techniques the channel capabilities are far greater. For example, two-satellites 108 working together can receive and broadcast over 150 conventional (non-HDTV) audio and video channels via 32 transponders.

While the invention disclosed herein is described with reference to a satellite based digital video distribution system 100, the present invention may also be practiced with terrestrial-based transmission of program information, whether by broadcast, unicast, cable, the Internet, or other means. Further, the different functions collectively allocated among the control center 102 and the uplink 104 as described above can be reallocated between these facilities as desired without departing from the intended scope of the present invention.

Although the foregoing has been described with respect to an embodiment in which the program material delivered to the subscriber is video (and audio) program material such as a movie, the foregoing method can be used to deliver program material comprising purely audio, or any multimedia combination of information and services as well.

Figure 2:
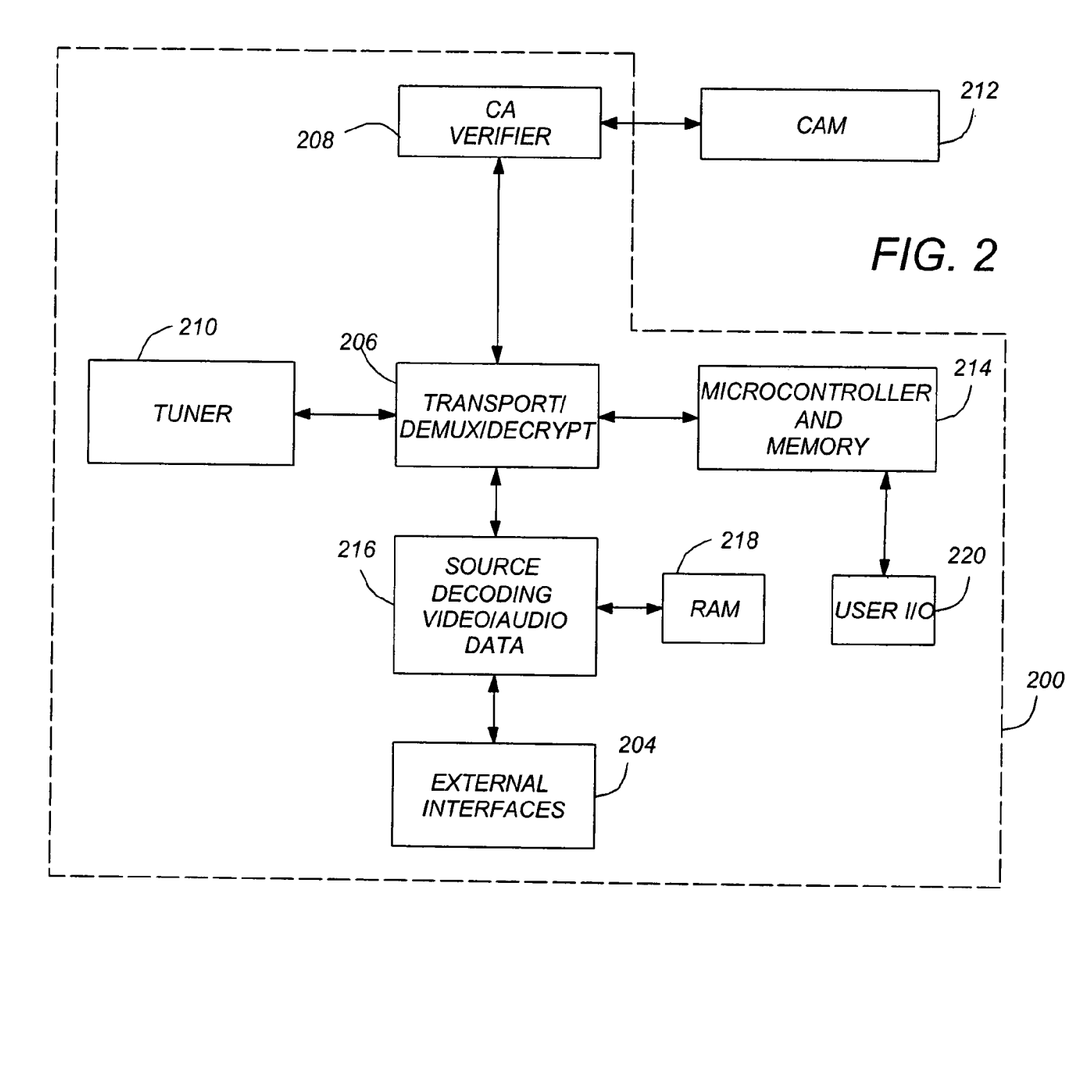
FIG. 2 is a block diagram of an integrated receiver/decoder for practicing the present invention.

FIG. 2 is a simplified block diagram of an IRD 200. The IRD 200 receives and decrypts the media programs broadcast by the video distribution system 100. These media programs are streamed to the IRD 200 in real time, and may include, for example, video, audio, or data services.

The IRD 200 is communicatively coupleable to a conditional access module (CAM) 212. The CAM 212 is typically implemented in a smart card or similar device, which is provided to the subscriber 110 to be inserted into the IRD 200. The CAM 212 interfaces with a conditional access verifier (CAV) 208 which performs at least some of the functions necessary to verify that the subscriber 110 is entitled to access the media programs.

The IRD 200 comprises a tuner 210, a transport and demultiplexing module (TDM) 206, which operates under control of a microcontroller and associated memory 206, a source decoder 216 and communicatively coupled random access memory (RAM) 218, and a user I/O device for accepting subscriber 110 commands and for providing output information to the subscriber.

The tuner 210 receives the data packets from the video distribution system and provides the packets to the TDM 206. Using the Service Channel IDs (SCIDs) associated with each media program, the TDM 206 reassembles the data packets according to the channel selected by the subscriber 110, and unencrypts the media programs using the Control Word (CW) key. The TDM 206 can be implemented by a single chip, and is communicatively coupled to a microcontroller and memory 214.

Once the media programs are unencrypted, they are provided to the source decoder 216 which decodes the media program data according to MPEG or JPEG standards as appropriate. The decoded media program is then provided to a D/A converter (if necessary) and provided to external interfaces 204 which can include a media program presentation device such as a television, an audio system, a computer, or a media storage device such as a hard drive. The source decoder 216 makes use of communicatively coupled RAM 218 to perform these functions.

The CW key is obtained from the Control Word packet (CWP) using the CAV 208 and the CAM 212. The TDM 206 provides the CWP to the CAM 212 via the CAV 208. The CAM 212 uses a secure algorithm to extract or generate the CW, which is provided back to the TDM 206. The TDM 206 uses the CW to decrypt the media programs. In most IRDs 200, the CAV 208 and the CAM 212 are capable of decrypting one video/audio/data media program at a time.

Figure 3A:
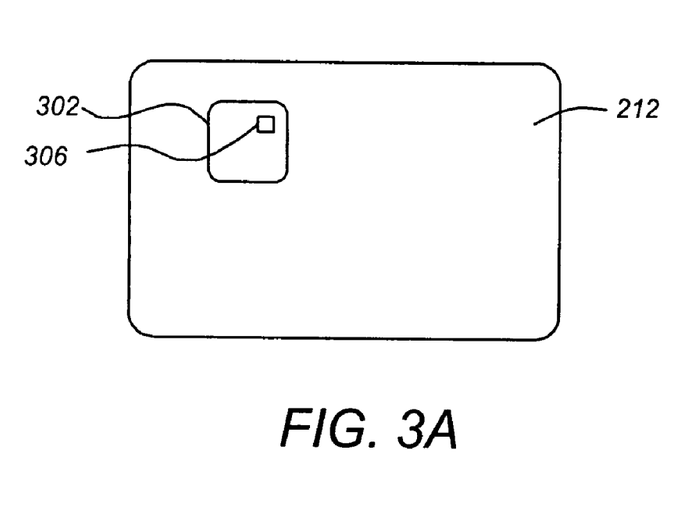
FIGS. 3A and 3B illustrate a CAM and IRD of the present invention.
Figure 3B:
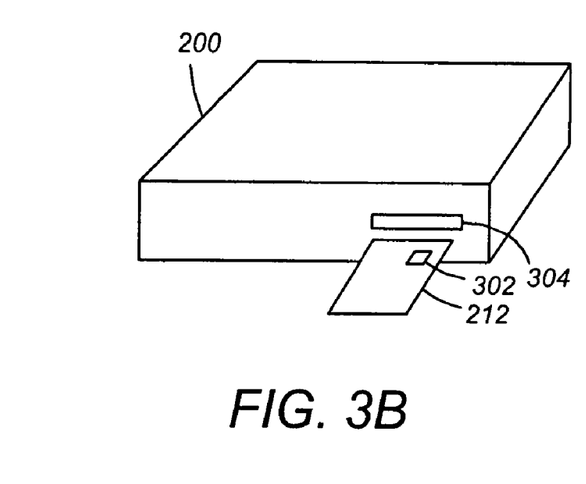

FIGS. 3A and 3B illustrate a CAM 212 and IRD 200 of the present invention. FIG. 3A is a diagram showing a CAM 212. The CAM 212 includes a processor 302 that, upon insertion into carrier 304 in the receiver 200, makes communicative contact with the CAV 208 via one or more processor contacts 306. In one embodiment, the CAM 212 and its associated interfaces in the receiver 200 is International Standards Organization (ISO) 7816 compliant. FIG. 3B illustrates the CAM 212 insertion into the IRD 200. The CAM 212 is identifiable to the IRD 200 through the processor contacts 306. In a typical embodiment, identification is accomplished with a unique serial number embedded in the processor 302 that may be read by the transport module 208. The processor 302 may be an application specific integrated circuit (ASIC) that may be changed in different CAM 212 productions to improve system security. Prior to the present invention, different production CAMs 212 would be compatible with every existing or future IRD 200.

The decrypting functions of the processor 302 are activated by an activating signal, which is typically provided after the user establishes a broadcast service account. In one embodiment, the activating signal comprises a message having a series of numbers or characters defining one or more decryption keys. In another embodiment, the activating signal may comprise a series of program instructions (which may also be encrypted) implementing one or more required subfunctions for program material decryption.

The activating signal can be delivered by different media, including, for example, via satellite, via terrestrial broadcast, via a cable line, the Internet, or a modem connection. Upon activation, the processor decrypting circuit is enabled, so that the encrypted television signal, transmitted by a broadcast service provider, can be decrypted. In CAMs 212 which have been circumvented, the decrypting functions of the primary processor 302 may have been enabled without requiring an activating signal. Such a circumvented CAM 212 might be used in any legacy IRD 200 or any future IRD 200.

To reduce the incentives and curtail the effects of circumventing CAMs 212, in a typical embodiment of the invention, the CAV 208 identifies CAMs 212 which will not be allowed to operate with the IRD 200. The CAMs 212 may be identified by an identification number which is read from the CAM 212 by the CAV 208 before allowing access to the broadcast services. The CAV 208 includes a list (or perhaps defined ranges) of excluded CAMs 212. If the current CAM 212 in the IRD 200 is on the list, the IRD 200 is disabled.

In effect, the present invention provides a technique of selective incompatibility or inoperability between IRDs 200 and CAMs 212 to limit the usefulness of circumvented CAMs 212 with limited inconvenience to lawful subscribers. The selective incompatibility of CAMs 212 and IRDs 200 may be organized in any number of ways. For example, all versions of CAMs 212 prior to the most current may be selected or particular versions (or even individual CAMs 212) known to have been circumvented may be selected. Potential inconvenience to lawful subscribers may be estimated from release date information of various CAMs 212 and IRDs 200 and supply chain knowledge, in addition to actual knowledge of CAMs 212 associated with active accounts.

Figure 4A:
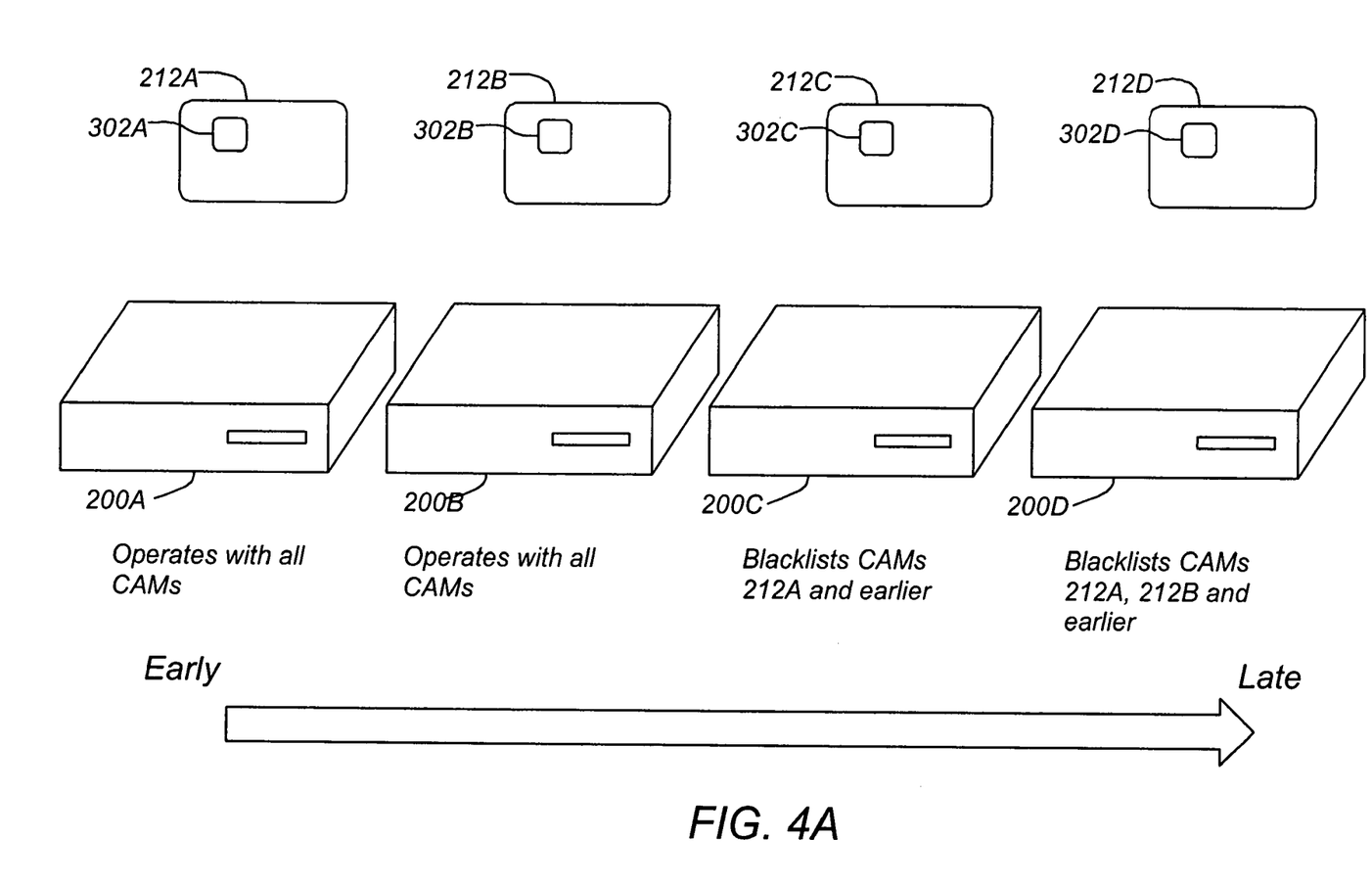
FIGS. 4A-4C illustrate examples of selective blacklisting.
Figure 4B:
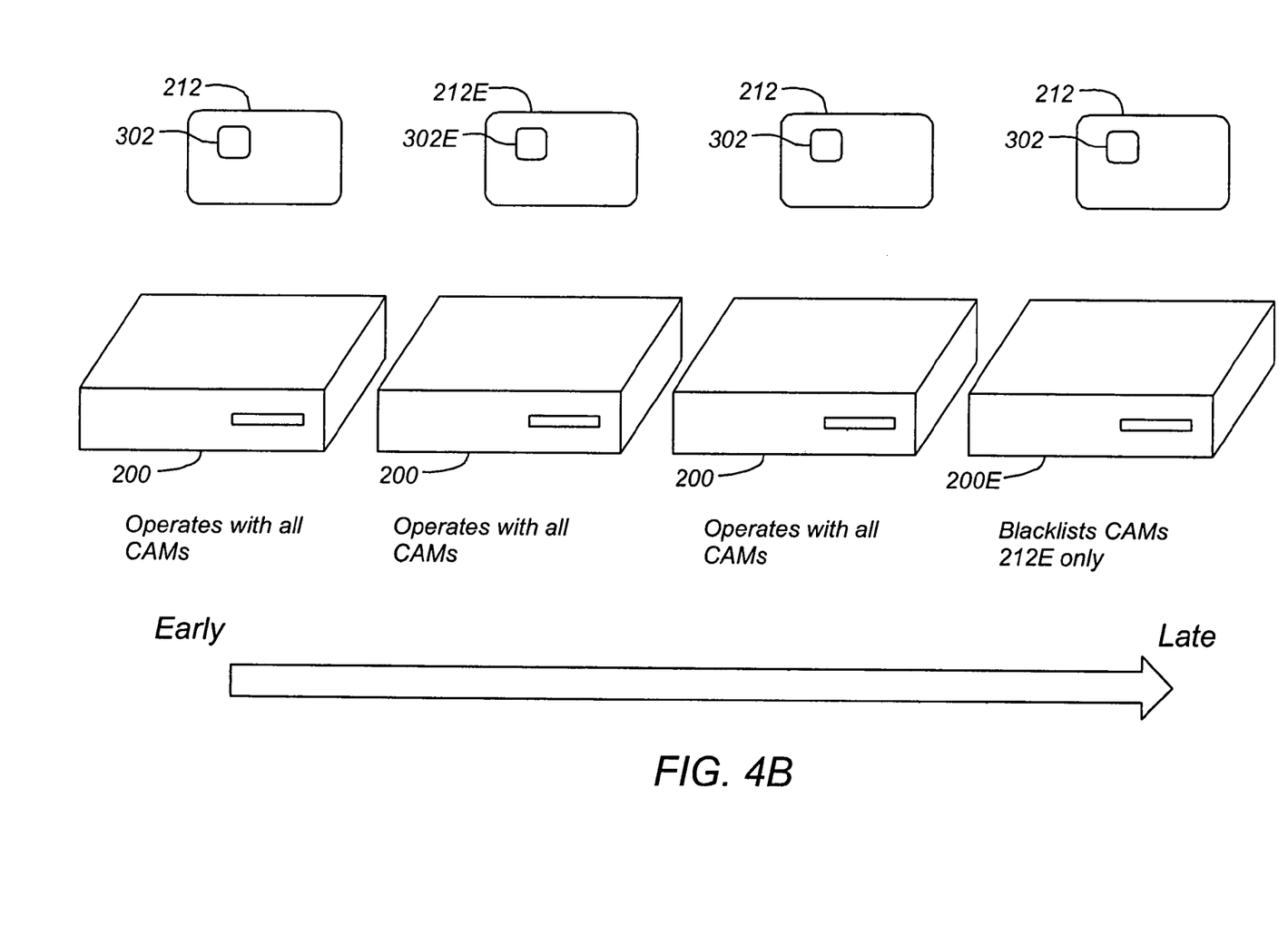
Figure 4C:
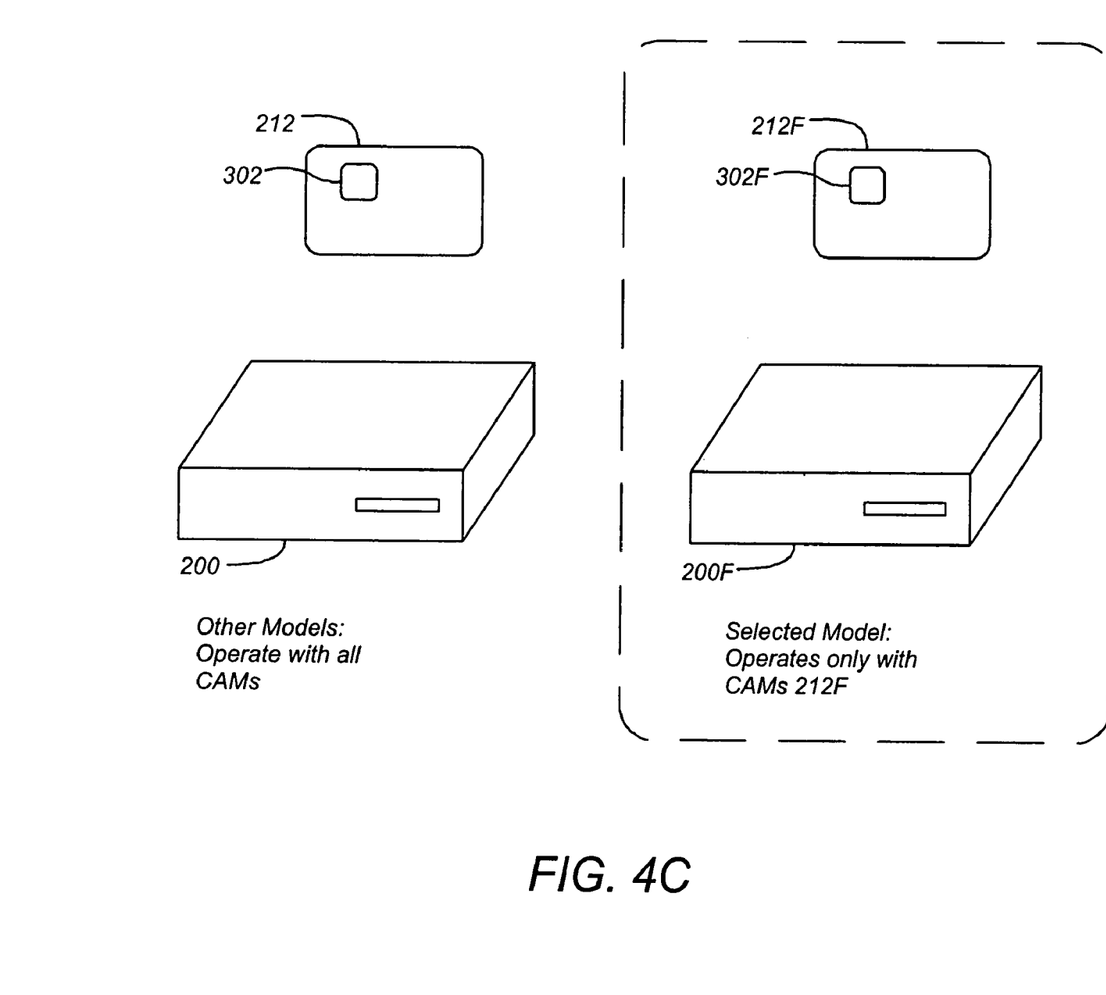

FIGS. 4A-4C illustrate examples of different plans for selective incompatibility. As will be detailed hereafter, different CAMs 212A-212F, identified by coding in their respective processors 302A-302F, will be selectively compatible with different IRDs 200A-200F.

In a preferred embodiment, the selective compatibility is structured as a rolling blacklist as illustrated in FIG. 4A. There is an ongoing production of both CAMs 212A-212D and IRDs 200A-200D. Later production IRDs 200C, 200D will include blacklists of earlier production CAMs 200A, 200B. For example under this approach, CAMs 212A, 212B and earlier, manufactured prior to a specified period prior to the date of manufacture of the receiver, are rendered inoperable with the later production IRD 200D. IRDs 200C, being earlier than the IRDs 200D, will blacklist only CAMs 212A and earlier. Similarly, it is expected that CAMs 212C, 212D will be blacklisted by future IRDs when they are produced. The specified period is determined as discussed above and may be altered at any time. Thus, a moving window of backward compatibility of IRDs 200 with CAMs 212 is completely controlled at the point of IRD 200 production. IRDs 200 remain forward-compatible with CAMs 212 in this embodiment; older IRDs 200 will always function with newer CAMs 212. Equivalently, the later IRDs may include selective lists (or open ended ranges), instead of blacklists, which identify CAMs 212 that will allow the IRD 200 to operate. All other, i.e. earlier, CAMs 212 will render the IRD 200 inoperable. Alternately, the rolling CAM 212 blacklist may be related to IRD 200 or CAM 212 serial numbers, versions or models.

FIG. 4B illustrates selective blacklisting in a targeted blacklisting approach, wherein the blacklisted CAMs 212E are CAMs 212E determined very likely to have been circumvented, perhaps due to a later discovered weakness unique to a particular CAM production. Although legacy IRDs 200 will operate with the circumvented CAMs 212E, they are blacklisted from all current and future production IRDs 200E. Any other ordinary production CAM 212 (early or late) will still render the late production IRD 200E operable.

FIG. 4C illustrates another possible embodiment. In this case "reverse" selective blacklisting (or selective listing) is applied, wherein only the identified CAMs 212F render the particular IRDs 200F operable. This scheme may be useful if certain IRDs 200F include special features enabled by the selected CAMs 212F. Thus, classes of CAMs 212F and IRDs 200F may be paired based upon the needs of the system operator. In this case, the selected CAMs 212F would have to be preplanned before production of the IRDs 200F and may be better identified as being a particular CAM version rather than specific serial numbers. This embodiment is not tied to production timing. However, the operator must consider plans to support the particular IRDs 200F with proper CAMs 212F in the future.

Various other selective blacklisting (or listing) schemes, including combinations of the foregoing examples, will be readily apparent to those skilled in the art. CAMs 212 may be provided directly to the subscriber by the vendor, or indirectly through a third party. Typically, the vendor will want to exert control over the design and distribution of CAMs 212 to coordinate their use with other aspects of the program distribution system and improve security as previously discussed.

Figure 5:
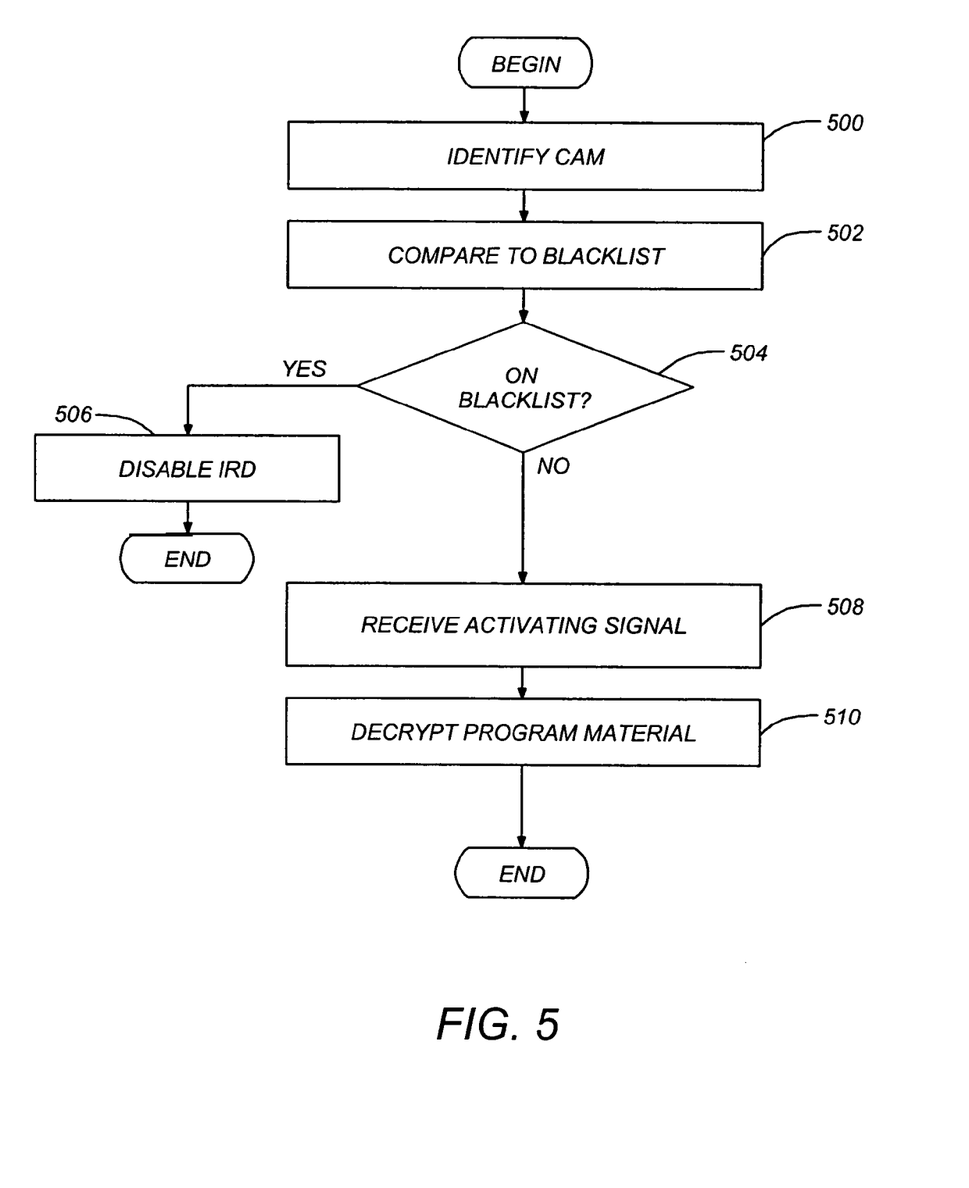
FIG. 5 is a flowchart presenting illustrative method steps used to practice on embodiment of the invention.

FIG. 5 is a flow chart presenting exemplary method steps used to practice a typical embodiment of the present invention. First, the CAM 212 is identified in block 500. The identity of the CAM 212 is then compared to a blacklist in block 502. At decision block 504, if the CAM 212 is on the blacklist the process is directed to disable the IRD at block 506. If instead, the CAM 212 is not on the blacklist, the IRD 200 receives the activating and control signals transmitted from the control center 102 at block 508. The CAM 212 is activated and serves to decrypt program signals, in block 510 and the subscriber receives programming and services normally. Of course in a "reverse" blacklist embodiment, the IRD 200 is disabled if the CAM 212 is not on the list and enabled if the CAM 212 is on the list.

CONCLUSION

A number of embodiments of the invention have been described herein, but it will be evident to the skilled person that numerous alternative embodiments may also be adopted. Such alternative embodiments will also accomplish the objective of providing backup services that can be activated during an emergency situation.

For example, although the foregoing has been described with respect to the use of a direct broadcast satellite system, the devices and techniques disclosed herein can be used to provide selective security control, carried out through new product sales. The CAM 212 can be any type of device that provides conditional access to a service. Although such devices are typically the approximate size and shape of a credit card, other sizes and shapes can be used to accomplish the same objective of providing access. The system and method of the invention can be adapted to other types of conditional access systems in which a separable, identifiable access control device is used in a receiving unit.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus for selectively controlling reception of a transmitted service, comprising:
   a receiver communicatively coupleable to an identifiable replaceable conditional access module (CAM) identified by an identification to enable reception of the service; and
   an authenticator controlling the operability of the receiver according to a comparison between the identification and a list comprising an identification of a plurality of CAMs;
   wherein the authenticator renders the receiver inoperable according to the comparison.

2. The apparatus of claim 1, wherein the receiver is an integrated receiver/decoder (IRD).

3. The apparatus of claim 1, wherein the authenticator comprises embedded software stored in the receiver.

4. The apparatus of claim 1, wherein the authenticator is included in a conditional access verifier of the receiver.

5. The apparatus of claim 1, wherein the identification is a serial number of the CAM.

6. The apparatus of claim 1, wherein the identification indicates a CAM version.

7. The apparatus of claim 1, wherein the identification indicates a date of manufacture of the CAM.

8. The apparatus of claim 1, wherein the list is based upon a date of manufacture of the receiver.

9. The apparatus of claim 1, wherein the list is based upon a version of the receiver.

10. The apparatus of claim 1, wherein the list comprises a list of an identification of older CAMs.

11. The apparatus of claim 1, wherein the list comprises a list an identification of likely circumvented versions of CAMs.

12. The apparatus of claim 1, wherein the list comprises a list of an identification of CAMs manufactured prior to a specified date.

13. The apparatus of claim 1, wherein the list comprises a list of an identification of CAMs manufactured prior to a specified period before a date of manufacture of the receiver.

14. The apparatus of claim 1, wherein the list is defined by a range of identification of CAMs.

15. The apparatus of claim 14, wherein the range is an open ended range.

16. The apparatus of claim 1, wherein the list comprises a list of an identification of authorized CAMs.

17. The apparatus of claim 1, wherein the list is comprises a list of an identification of unauthorized CAMs.

18. A method of selectively controlling reception of a transmitted service in a receiver requiring an identifiable conditional access module (CAM) to operate, wherein the receiver is one of a plurality of receiver versions, including a most current receiver version, and the CAM is one of a plurality of CAM versions including a most current CAM version, comprising the steps of:
   reading an identification of the CAM; and
   controlling the operability of the receiver according to the identification of the CAM such that the most current CAM version is operable with all of the plurality of receiver versions, and the most current receiver version is operable only with the most current CAM version.

19. The method of claim 18, wherein the receiver is an integrated receiver/decoder (IRD).

20. The method of claim 18, wherein the identified CAM comprises a replaceable CAM including an application specific integrated circuit.

21. The method of claim 18, wherein the identification comprises a serial number of the CAM.

22. The method of claim 18, wherein the identification indicates a CAM version.

23. The method of claim 18, wherein the identification indicates a date of manufacture of the CAM.

24. The method of claim 18, wherein the operability of the receiver is controlled according to a comparison between the identification of the CAM and a list of identifications of CAMs.

25. The method of claim 24, wherein the list of CAMs is based upon a date of manufacture of the receiver.

26. The method of claim 24, wherein the list of CAMs is based upon a version of the receiver.

27. The method of claim 24, wherein the list of CAMs comprises a list of identifications of older CAMs.

28. The method of claim 24, wherein the list of CAMs comprises a list of identifications of likely circumvented versions of CAMs.

29. The method of claim 24, wherein the list of CAMs comprises a list of identifications of CAMs manufactured prior to a specified date.

30. The method of claim 24, wherein the list of CAMs comprises a list of identifications of CAMs manufactured prior to a specified period before a date of manufacture of the receiver.

31. An apparatus for selectively controlling reception of a transmitted service in a receiver requiring an identifiable conditional access module (CAM) to operate, wherein the receiver is one of a plurality of receiver versions, including a most current receiver version, and the CAM is one of a plurality of CAM versions including a most current CAM version, comprising the steps of:
   means for reading an identification of the CAM; and
   means for controlling the operability of the receiver according to the identification of the CAM such that the most current CAM version is operable with all of the plurality of receiver versions, and the most current receiver version is operable only with the most current CAM version.

32. The apparatus of claim 31, wherein the receiver is an integrated receiver/decoder (IRD).

33. The apparatus of claim 31, wherein the identified CAM comprises a replaceable CAM including an application specific integrated circuit.

34. The apparatus of claim 31, wherein the identification comprises a serial number of the CAM.

35. The apparatus of claim 31, wherein the identification indicates a CAM version.

36. The apparatus of claim 31, wherein the identification indicates a date of manufacture of the CAM.

37. The apparatus of claim 31, wherein the operability of the receiver is controlled according to a comparison between the identification of the CAM and a list of identifications of CAMs.

38. The apparatus of claim 37, wherein the list of CAMs is based upon a date of manufacture of the receiver.

39. The apparatus of claim 37, wherein the list of CAMs is based upon a version of the receiver.

40. The apparatus of claim 37, wherein the list of CAMs comprises a list of identifications of older CAMs.

41. The apparatus of claim 37, wherein the list of CAMs comprises a list of identifications of likely circumvented versions of CAMs.

42. The apparatus of claim 37, wherein the list of CAMs comprises a list of identifications of CAMs manufactured prior to a specified date.

43. The apparatus of claim 37, wherein the list of CAMs comprises a list of identifications of CAMs manufactured prior to a specified period before a date of manufacture of the receiver.

44. A broadcast security system for selectively controlling reception of a broadcasted service, comprising:

a broadcast service transmitted to one or more receivers;

wherein the one or more receivers are each communicatively coupleable conditional access module (CAM) identified by an identification to enable reception of the broadcasted service, and each receiver comprises an authenticator controlling the operability of the receiver according to a comparison between the identification and a list, wherein the receiver is rendered inoperable according to the comparison.

* * * * *